US011460106B2

(12) United States Patent
Morita et al.

(10) Patent No.: US 11,460,106 B2
(45) Date of Patent: Oct. 4, 2022

(54) CONTINUOUSLY VARIABLE TRANSMISSION AND METHOD FOR CONTROLLING CONTINUOUSLY VARIABLE TRANSMISSION

(71) Applicant: Nissan Motor Co., Ltd., Yokohama (JP)

(72) Inventors: Haruki Morita, Kanagawa (JP); Ryohey Toyoya, Kanagawa (JP); Akira Takano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 353 days.

(21) Appl. No.: 16/957,742

(22) PCT Filed: Dec. 28, 2017

(86) PCT No.: PCT/JP2017/047337
§ 371 (c)(1),
(2) Date: Jun. 25, 2020

(87) PCT Pub. No.: WO2019/130573
PCT Pub. Date: Jul. 4, 2019

(65) Prior Publication Data
US 2020/0347932 A1 Nov. 5, 2020

(51) Int. Cl.
*F16H 61/662* (2006.01)
*F16H 9/18* (2006.01)
(Continued)

(52) U.S. Cl.
CPC ............. *F16H 61/662* (2013.01); *F16H 9/18* (2013.01); *F16H 61/30* (2013.01)

(58) Field of Classification Search
CPC .... F16H 61/30; F16H 61/0206; F16H 61/662; F16H 9/18
See application file for complete search history.

(56) References Cited

U.S. PATENT DOCUMENTS 8,812,201 B2 *  8/2014  Kimura .................. F15B 21/04
                                                60/329
10,309,526 B2 *  6/2019  Katakura ............ F16H 61/0031
(Continued)

FOREIGN PATENT DOCUMENTS

| JP | 4299068 B2 | 7/2009 |
| JP | 2014-52034 A | 3/2014 |
| JP | 2016-65588 A | 4/2016 |

*Primary Examiner* — Tinh Dang
(74) *Attorney, Agent, or Firm* — Global IP Counselors, LLP (57) ABSTRACT

A continuously variable transmission includes an electric oil pump disposed in an oil passage between primary and secondary pulley oil chambers. An oil passage switching valve is disposed between the oil pump and the primary pulley oil chamber. The oil passage switching valve switches between a first switching position in which the primary pulley oil chamber and the oil pump are connected, and a second switching position in which the primary pulley oil chamber and the oil pump are disconnected and in which the oil pump and an oil passage connecting an oil reservoir and the oil passage switching valve are connected. In addition, the continuously variable transmission includes a discharge mechanism having a leak valve disposed in the oil passage between the electric oil pump and the oil passage switching valve for discharging oil that is discharged from the oil pump towards the primary pulley oil chamber.

7 Claims, 9 Drawing Sheets

(51) Int. Cl.
*F16H 61/30* (2006.01)
*F16H 61/02* (2006.01)

(56) References Cited

U.S. PATENT DOCUMENTS

| | | | |
|---|---|---|---|
| 10,576,965 B2 * | 3/2020 | Katakura | B60K 6/543 |
| 10,837,547 B2 * | 11/2020 | Shimizu | B60K 6/543 |
| 2018/0106363 A1 * | 4/2018 | Katakura | F16H 61/0031 |

* cited by examiner

FIG. 9

CONTINUOUSLY VARIABLE TRANSMISSION AND METHOD FOR CONTROLLING CONTINUOUSLY VARIABLE TRANSMISSION

CROSS-REFERENCE TO RELATED APPLICATIONS

This application is a U.S. national stage application of International Application No. PCT/JP2017/047337, filed on Dec. 28, 2017.

TECHNICAL FIELD

The present invention relates to a continuously variable transmission that controls flow of oil into and out of a primary pulley oil chamber by means of an electric oil pump disposed in an oil passage between the primary pulley oil chamber and a secondary pulley oil chamber.

BACKGROUND INFORMATION

Japanese Patent No. 4 299 068B2 discloses a continuously variable transmission that controls flow of oil into and out of a primary pulley oil chamber by means of an electric oil pump disposed in an oil passage between the primary pulley oil chamber and a secondary pulley oil chamber to thereby change the transmission ratio.

The continuously variable transmission disclosed in the above-described document is provided with a mechanical oil pump driven by an engine and serving as a hydraulic pressure source for supplying oil to the lubrication system. In addition, the vehicle disclosed in the above-described document carries out control to stop the engine during operation of the vehicle, such as idle stop, as a control for improving fuel consumption performance. When the engine stops, the mechanical oil pump also stops, so that it becomes necessary to use the electric oil pump as the hydraulic pressure source for supplying oil to the lubrication system. Thus, the continuously variable transmission disclosed in the above-described document is provided with a switching valve that has a first switching position for forming a hydraulic pressure circuit for shifting, which connects the electric oil pump and a transmission ratio control unit during operation of the engine, and a second switching position in which a part of the hydraulic circuit for shifting is cut off during engine stop, and one port of the electric oil pump is connected to the lubrication system, or the like, at the same time.

SUMMARY

With regard to the structure of the switching valve disclosed in the above-described document, during a switching operation from the first switching position to the second switching position, as well as during a reverse switching operation, there occurs a period in which the hydraulic circuit that connects to one port of the electric oil pump is cut off. When the circuit connected to one port of the electric oil pump is cut off, the motor that drives the electric oil pump locks up. As a result of the occurrence of such a lockup of the motor, there is the risk that the durability of the electric oil pump may be reduced.

Therefore, an object of the present invention is to suppress reduction of the durability of the electric oil pump.

A continuously variable transmission according to one aspect of the present invention comprises an electric oil pump that is disposed in an oil passage between a primary pulley oil chamber and a secondary pulley oil chamber, and that causes oil to flow into and out of the primary pulley oil chamber. One discharge port of the electric oil pump is connected to the secondary pulley oil chamber, and the other discharge port is connected to the primary pulley oil chamber via an oil passage switching valve. The oil passage switching valve is configured to switch between a first switching position in which the primary pulley oil chamber and the other discharge port are connected, and a second switching position in which the connection between the primary pulley oil chamber and the other discharge port is cut off and the other discharge port and an oil passage connecting an oil reservoir and the oil passage switching valve are connected. In addition, the continuously variable transmission includes a discharge mechanism in an oil passage between the electric oil pump and the oil passage switching valve for discharging from the oil passage the oil that is discharged from the other discharge port.

DETAILED DESCRIPTION OF THE EMBODIMENTS

Embodiments of the present invention will be described below, with reference to the drawings, etc.

First Embodiment

Figure 1:
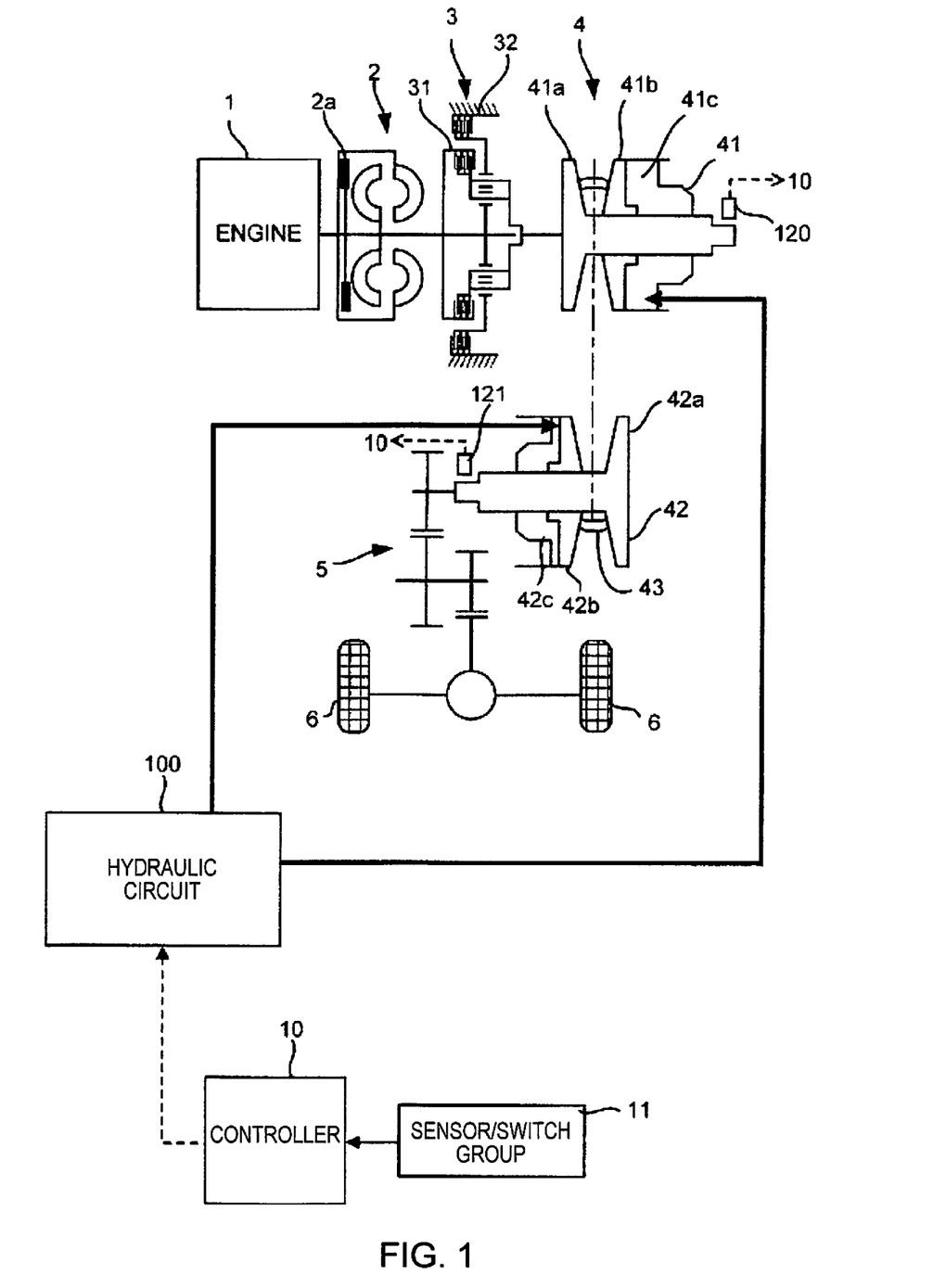
FIG. 1 is a schematic overview diagram of a vehicle.

FIG. 1 is a schematic overview diagram of a vehicle. The vehicle comprises an engine 1, a torque converter 2 with a lockup clutch 2a, a forward/reverse switching mechanism 3, a variator 4, a final reduction gear mechanism 5, drive wheels 6, and a hydraulic circuit 100.

The engine 1 constitutes a drive source of the vehicle. The output of the engine 1 is transmitted to the drive wheels 6 through the torque converter 2, the forward/reverse switching mechanism 3, the variator 4, and the final reduction gear mechanism 5. Accordingly, the variator 4 is provided in a power transmission path for transmitting power from the engine 1 to the drive wheels 6, together with the torque converter 2, the forward/reverse switching mechanism 3, and the final reduction gear mechanism 5.

The forward/reverse switching mechanism 3 is provided in the power transmission path between the torque converter 2 and the variator 4. The forward/reverse switching mechanism 3 switches the direction of the input rotation between a forward rotation direction corresponding to forward travel and a reverse rotation direction corresponding to reverse travel.

Specifically, the forward/reverse switching mechanism 3 includes a forward clutch 31 and a reverse brake 32. The forward clutch 31 is engaged when the rotational direction is to be the forward rotation direction. The reverse brake 32 is engaged when the rotational direction is to be the reverse rotation direction. Either the forward clutch 31 or the reverse brake 32 can be configured as a clutch that interrupts the rotation between the engine 1 and the variator 4.

The variator 4 has a primary pulley 41, a secondary pulley 42, and a belt 43 wound around the primary pulley 41 and the secondary pulley 42. Hereinbelow, the term primary is also referred to as PRI and the term secondary is also referred to as SEC. The variator 4 constitutes a belt-type continuously variable transmission mechanism that changes the groove widths of the PRI pulley 41 and the SEC pulley 42 to thereby change the winding diameter of the belt 43 (hereinafter simply referred to as "winding diameter"), in order to carry out gear shifting.

The PRI pulley 41 has a fixed pulley 41a and a movable pulley 41b. When a controller 10 controls the amount of oil supplied to a PRI pulley oil chamber 41c, the movable pulley 41b is operated and the groove width of the PRI pulley 41 is changed.

The SEC pulley 42 has a fixed pulley 42a and a movable pulley 42b. When the controller 10 controls the amount of oil supplied to a SEC pulley oil chamber 42c, the movable pulley 42b is operated and the groove width of the SEC pulley 42 is changed.

The belt 43 is wound onto a V-shaped sheave surface formed by the fixed pulley 41a and the movable pulley 41b of the PRI pulley 41, and a V-shaped sheave surface formed by the fixed pulley 42a and the movable pulley 42b of the SEC pulley 42.

The final reduction gear mechanism 5 transmits output rotation from the variator 4 to the drive wheels 6. The final reduction gear mechanism 5 is configured to have a plurality of gear trains and differential gears. The final reduction gear mechanism 5 rotates the drive wheels 6 via an axle.

The hydraulic circuit 100 supplies hydraulic pressure to the variator 4, specifically, to the PRI pulley 41 and the SEC pulley 42. The hydraulic circuit 100 also supplies hydraulic pressure to the forward/reverse switching mechanism 3, the lockup clutch 2a, a lubrication system and a cooling system, which are not shown. The hydraulic circuit 100 is specifically configured as follows.

Figure 2:
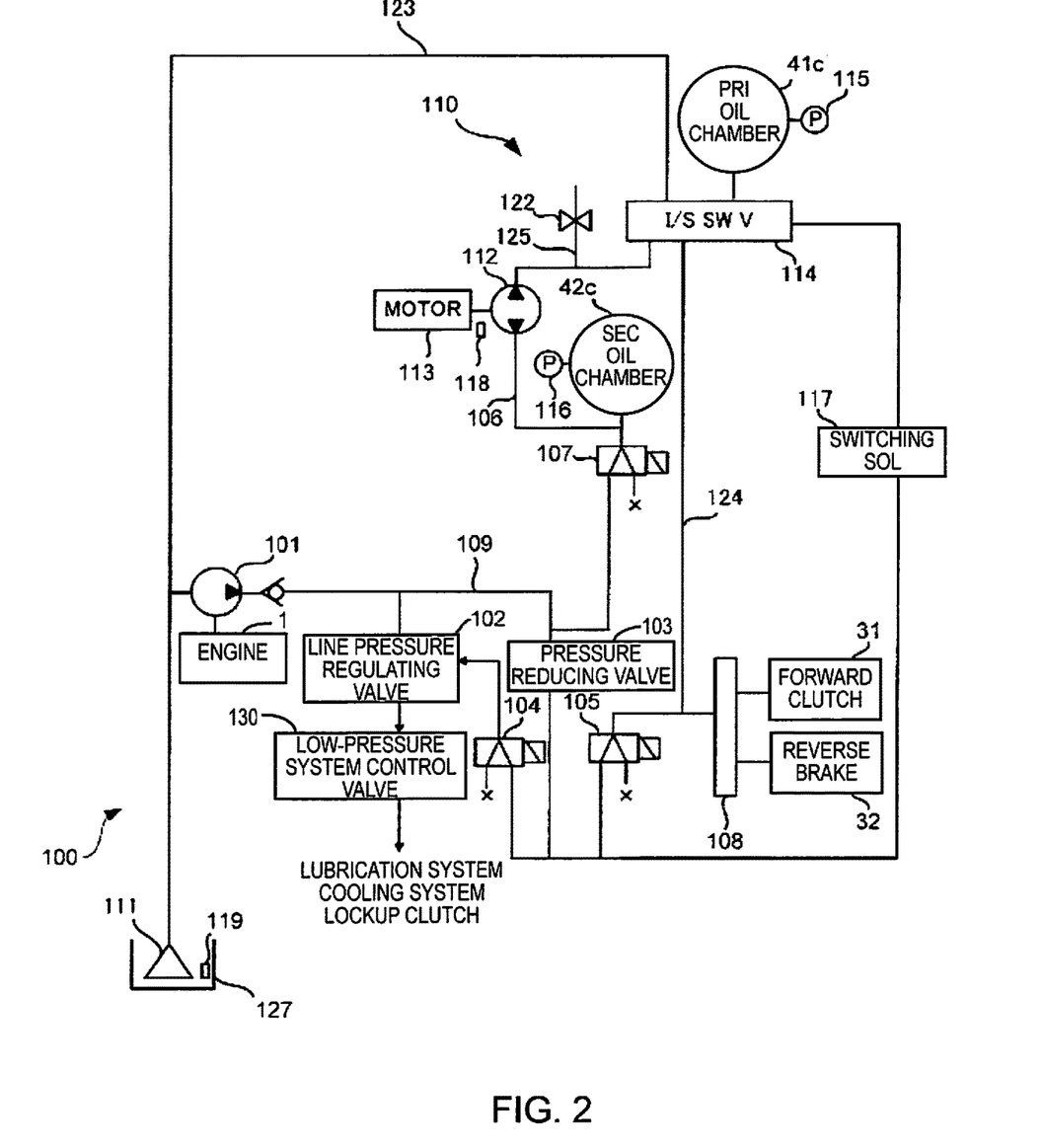
FIG. 2 is a schematic overview diagram of a hydraulic circuit according to a first embodiment.

FIG. 2 is a schematic overview diagram of the hydraulic circuit 100. The hydraulic circuit 100 has a source pressure oil pump 101, a line pressure regulating valve 102, a pressure reducing valve 103, a line pressure solenoid valve 104, a forward/reverse switching mechanism solenoid valve 105, a transmission circuit pressure solenoid valve 107, a manual valve 108, a line pressure oil passage 109, a low-pressure control valve 130, and a transmission circuit 110. Hereinbelow, a solenoid valve is referred to as SOL.

The source pressure oil pump 101 is a mechanical oil pump that is driven by the power of the engine 1 to suction oil from an oil reservoir 127 via a strainer 111. The source pressure oil pump 101 is connected to the line pressure regulating valve 102, the pressure reducing valve 103, the transmission circuit pressure SOL 107, and the transmission circuit 110, via the line pressure oil passage 109. The line pressure oil passage 109 constitutes the oil passage for the line pressure. The line pressure is the hydraulic pressure serving as the source pressure of the PRI pressure and the SEC pressure.

The line pressure regulating valve 102 adjusts the hydraulic pressure generated by the source pressure oil pump 101 to generate the line pressure. The generation of the line pressure by the source pressure oil pump 101 includes generating the line pressure under the operation of the line pressure regulating valve 102. The oil relieved by the line pressure regulating valve 102 at the time of pressure regulation is supplied to the lockup clutch 2a, the lubrication system, and the cooling system via the low-pressure control valve 130.

The pressure reducing valve 103 reduces the line pressure. The hydraulic pressure that is reduced by the pressure reducing valve 103 is supplied to the line pressure SOL 104 and the forward/reverse switching mechanism SOL 105.

The line pressure SOL 104 is a linear solenoid valve and generates control oil pressure corresponding to a control current. The control oil pressure generated by the line pressure SOL 104 is supplied to the line pressure regulating valve 102, and the line pressure regulating valve 102 regulates the pressure by operating in accordance with the control oil pressure generated by the line pressure SOL 104. Therefore, a command value of a line pressure PL can be set by means of the control current to the line pressure SOL 104.

The forward/reverse switching mechanism SOL 105 is a linear solenoid valve and generates a control oil pressure corresponding to the control current. The hydraulic pressure generated by the forward/reverse switching mechanism SOL 105 is supplied to the forward clutch 31 and the reverse brake 32 via the manual valve 108, which operates in accordance with a driver's operation.

The transmission circuit pressure SOL 107 is a linear solenoid valve and generates hydraulic pressure to be supplied to the transmission circuit 110 in accordance with the control current. Therefore, a command value of the transmission circuit pressure can be set by means of the control current to the transmission circuit pressure SOL 107. The transmission circuit pressure generated by the transmission circuit pressure SOL 107 is supplied to a transmission oil passage 106. For example, the transmission circuit pressure can be generated by a SOL that generates a control oil pressure corresponding to the control current and a pressure regulating valve that generates a control circuit pressure from the line pressure PL in accordance with the control oil pressure generated by said SOL.

The transmission circuit 110 includes the transmission oil passage 106, which is connected to the line pressure oil passage 109 via the transmission circuit pressure SOL 107, and a transmission oil pump 112 that is interposed in the transmission oil passage 106. The transmission oil passage 106 connects the PRI pulley oil chamber 41c and the SEC pulley oil chamber 42c. An idle stop switching valve 114 is interposed between the PRI pulley oil chamber 41c and the transmission oil pump 112 of the transmission oil passage 106. An oil passage 123 that branches from between the strainer 111 and the source pressure oil pump 101, and an oil passage 124 that branches from between the forward/reverse switching mechanism SOL 105 and the manual valve 108 are connected to the idle stop switching valve 114.

The idle stop switching valve 114 is a spool valve that is driven by a switching SOL 117. The structure of the idle stop switching valve 114 will be described further below.

A leak oil passage 125 branches from a portion of the transmission circuit 110 between the idle stop switching valve 114 and the transmission oil pump 112. The end portion on the opposite side of the branch point of the leak oil passage 125 is open. Oil leaks continuously from this open end. An orifice 122 is interposed in the leak oil passage 125.

The transmission oil pump 112 is an electric-type oil pump (electric oil pump) that is driven by an electric motor 113. The electric motor 113 is a so-called inverter-integrated motor, which is controlled by the controller 10 through an inverter that is not shown.

The transmission oil pump 112 can switch the rotational direction between the forward direction and the reverse direction. The forward direction here is the direction in which the oil is sent from the SEC pulley oil chamber 42c to the PRI pulley oil chamber 41c, and the reverse direction is the direction in which the oil is sent from the PRI pulley oil chamber 41c to the SEC pulley oil chamber 42c.

When the transmission oil pump 112 rotates in the forward direction, the oil in the transmission oil passage 106 and the SEC pulley oil chamber 42c is supplied to the PM pulley oil chamber 41c. The movable pulley 41b of the PRI pulley 41 thereby moves in the direction approaching the fixed pulley 41a, and the groove width of the PRI pulley 41 decreases. On the other hand, the movable pulley 42b of the SEC pulley 42 moves in the direction away from the fixed pulley 42a, and the groove width of the SEC pulley 42 increases. When the transmission oil pump 112 rotates in the forward direction, oil is supplied from the line pressure oil passage 109 to the transmission oil passage 106 such that the hydraulic pressure (hereinafter also referred to as "SEC side hydraulic pressure") of the transmission oil passage 106 closer to the SEC pulley oil chamber 42c side (hereinafter also referred to as "SEC side") than the transmission oil pump 112 does not fall below a command value of the transmission circuit pressure. The command value of the transmission circuit pressure is set in consideration of preventing slippage of the belt 43, and the like. The hydraulic pressure of the transmission oil passage 106 closer to the PRI pulley oil chamber 41c side (hereinafter also referred to as "PRI side") than the transmission oil pump 112 is also referred to as PRI side hydraulic pressure.

In addition, when the transmission oil pump 112 rotates in the reverse direction, oil flows out of the PRI pulley oil chamber 41c. The movable pulley 41b of the PRI pulley 41 thereby moves in the direction away from the fixed pulley 41a, and the groove width of the PRI pulley 41 increases. On the other hand, the movable pulley 42b of the SEC pulley 42 moves in the direction approaching the fixed pulley 42a, and the groove width of the SEC pulley 42 decreases. Although the SEC side hydraulic pressure increases due to the inflow of the oil flowing out of the PRI pulley oil chamber 41c, the SEC side hydraulic pressure is controlled so as not to exceed the command value by the transmission circuit pressure SOL 107. That is, in the case that the SEC side hydraulic pressure exceeds the command value, oil is discharged from the transmission oil passage 106 via the transmission circuit pressure SOL 107. On the other hand, in the case that the SEC side hydraulic pressure is less than the command value, oil flows in from the line pressure oil passage 109 via the transmission circuit pressure SOL 107.

As described above, the continuously variable transmission according to the present embodiment carries out gear shifting by controlling the flow of oil into and out of the PRI pulley oil chamber 41c by means of the transmission oil pump 112. An outline of the shift control will be described further below.

Returning to FIG. 1, the vehicle further comprises the controller 10. The controller 10 is an electronic control device, and signals from a sensor/switch group 11 are input to the controller 10. The controller 10 is configured by a microcomputer provided with a central processing unit (CPU), read-only memory (ROM), random access memory (RAM), and an input/output interface (I/O interface). The controller 10 may also be configured by a plurality of microcomputers.

The sensor/switch group 11 includes, for example, an accelerator pedal opening degree sensor for detecting the accelerator pedal opening degree of the vehicle, a brake sensor for detecting the brake pressing force of the vehicle, a vehicle speed sensor for detecting vehicle speed Vsp, and an engine rotational speed sensor for detecting rotational speed NE of the engine 1.

The sensor/switch group 11 further includes, for example, a PRI pressure sensor 115 for detecting the PRI pressure, a SEC pressure sensor 116 for detecting the SEC pressure, a PRI rotational speed sensor 120 for detecting the input-side rotational speed of the PRI pulley 41, a SEC rotational speed sensor 121 for detecting the output-side rotational speed of the SEC pulley 42, a pump rotational speed sensor 118 for detecting the rotational speed of the transmission oil pump 112, and an oil temperature sensor 119 for detecting the oil temperature. The signals from the sensor/switch group 11 can be input to the controller 10 via another controller, for example. The same applies to signals, such as information, generated by another controller based on signals from the sensor/switch group 11.

The controller 10 controls the hydraulic circuit 100 based on the signals from the sensor/switch group 11. Specifically, the controller 10 controls the line pressure SOL 104 and the transmission circuit 110 shown in FIG. 2. The controller 10 is further configured to control the forward/reverse switching mechanism SOL 105 and the transmission circuit pressure SOL 107.

When controlling the line pressure SOL 104, the controller 10 supplies, to the line pressure SOL 104, a control current corresponding to a command value of the line pressure PL.

When executing a shift control, the controller 10 sets a target transmission ratio based on signals from the sensor/switch group 11. When the target transmission ratio is determined, the winding diameters (target winding diameters) of the pulleys 41, 42 for achieving the target transmission ratio are determined. When the target winding diameters are determined, the groove widths (target groove widths) of the pulleys 41, 42 for achieving the target winding diameters are determined.

In addition, in the transmission circuit 110, the movable pulley 41b of the PRI pulley 41 moves in accordance with the flow of oil into and out of the PRI pulley oil chamber 41c by the transmission oil pump 112, and the movable pulley 42b of the SEC pulley 42 also moves in accordance therewith. That is, the amount of movement of the movable pulley 41b of the PRI pulley 41 is correlated with the amount of movement of the movable pulley 42b of the SEC pulley 42.

Therefore, the controller 10 operates the transmission oil pump 112 such that the position of the movable pulley 41b of the PRI pulley 41 is at a position corresponding to the target transmission ratio. Whether the movable pulley 41b is at the desired position is determined by calculating an actual transmission ratio from detected values of the PRI rotational speed sensor 120 and the SEC rotational speed sensor 121, and determining whether this actual transmission ratio and the target transmission ratio match.

In addition, the operation of the transmission oil pump 112 by the controller 10 is not limited to when shifting occurs. Even when the target transmission ratio does not change, the controller 10 operates the transmission oil pump 112 if oil leaks from the pulley oil chambers 41c, 42c. In the present embodiment, such a control for maintaining the target transmission ratio is included in the shift control.

That is, the shift control of the present embodiment is a feedback control for converging the position of the movable pulley 41b of the PRI pulley 41 to the target position. The target of the feedback control is not the hydraulic pressure of each of the pulley oil chambers 41c, 42c, but the groove width of the PRI pulley 41, in other words, the position of the movable pulley 41b.

A sensor for detecting the position of the movable pulley 41b can be provided to determine whether the movable pulley 41b is at a position corresponding to the target transmission ratio.

As described above, the controller 10 operates the transmission oil pump 112 if oil leaks from the pulley oil chambers 41c, 42c, but this leak occurs because there is a gap between the cylinder and the piston. Then, the transmission oil pump 112 compensates for the leak, but the transmission oil pump 112 has a lower limit flow rate corresponding to a lower limit of the controllable rotational speed of the motor. Therefore, when the amount of oil leaking from the hydraulic circuit is small, there are cases in which the oil flow rate to be compensated falls below the lower limit flow rate. In such a case, even when attempting to supplement the oil corresponding to the amount of leak, oil that exceeds the flow rate will be supplied. Thus, in the present embodiment, the leak oil passage 125 is provided so that the amount of the leak does not fall below the lower limit flow rate of the transmission oil pump 112. The flow path diameter of the orifice 122 is set in accordance with the lower limit flow rate of the transmission oil pump 112.

Instead of providing the orifice 122, the flow path diameter of the leak oil passage 125 can be set in accordance with the lower limit flow rate of the transmission oil pump 112.

The structure and the operation of the idle stop switching valve 114 will now be described.

Figure 3:
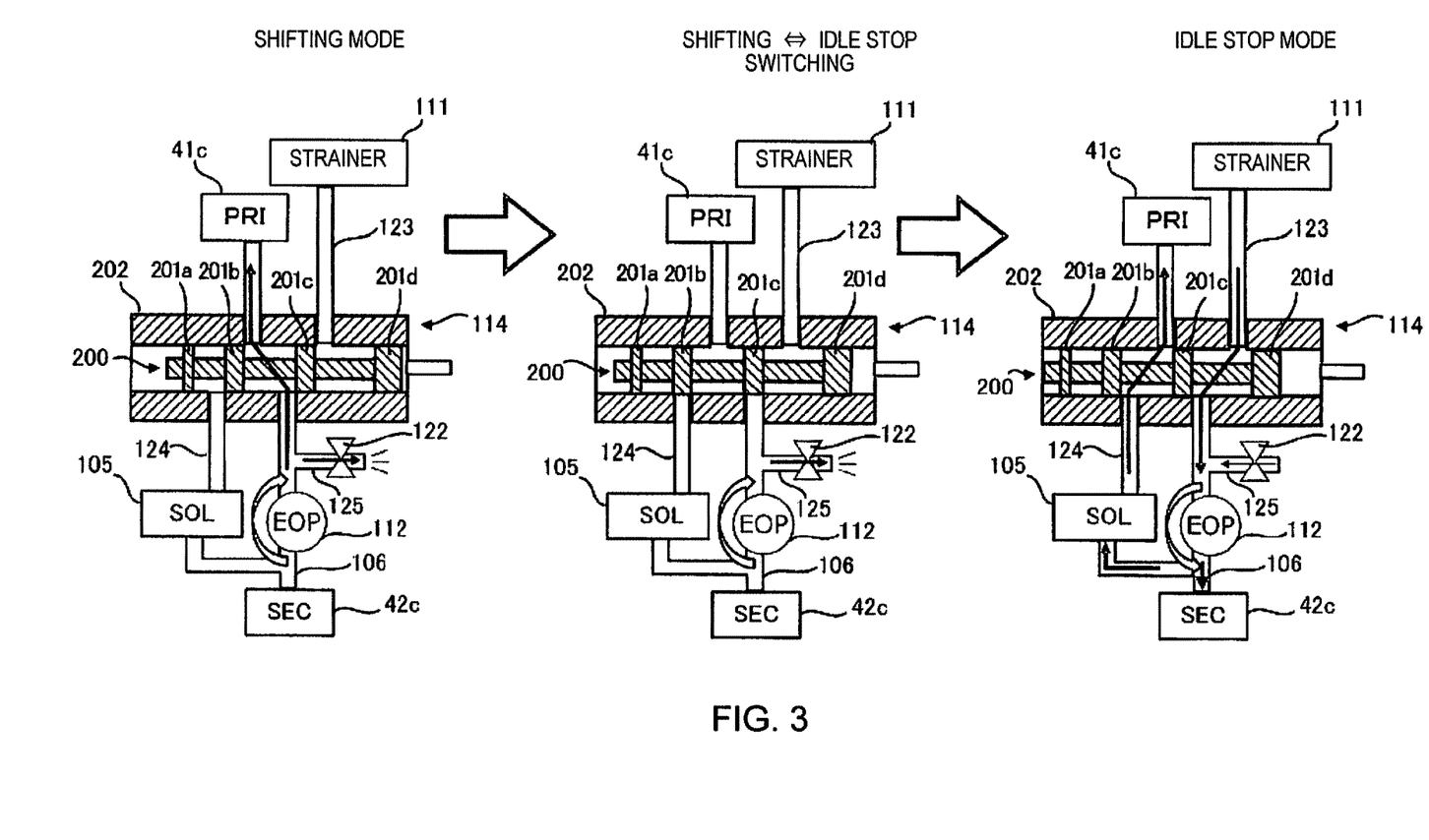
FIG. 3 is a diagram showing a flow of oil and operation of an idle stop switching valve according to the first embodiment.

FIG. 3 illustrates the state of the idle stop switching valve 114 when in the shifting mode, when in the idle stop mode, and when switching between the shifting mode and the idle stop mode. In FIG. 3, a part of the hydraulic circuit 100 shown in FIG. 2 is omitted and simplified. In addition, the black arrows in the figure represent the flow of the oil, and the white arrows represent the rotational direction of the transmission oil pump 112.

The shifting mode is a state in which the engine 1 is operating while the vehicle is being operated. The idle stop mode is a state in which a prescribed condition is satisfied during operation of the vehicle and the engine 1 is automatically stopped after the vehicle stops. The idle stop switching valve 114 is controlled to be in the first switching position when in the shifting mode, and to be in the second switching position when in the idle stop mode. In a vehicle that executes a coast stop mode, in which the engine 1 is automatically stopped before the vehicle stops, instead of the idle stop mode, the idle stop switching valve 114 is controlled to be in the second switching position when in the coast stop mode.

The idle stop switching valve 114 is a spool valve that is driven by the switching SOL 117, as described above, and is configured to include a sleeve 202, and a spool 200 that is accommodated in a cylinder inside the sleeve 202 so as to be movable.

The sleeve 202 includes an oil passage that connects to the PRI pulley oil chamber 41c, and ports to which the transmission oil passages 106, 123, 124 are connected. The spool 200 has lands 201a-201d. Due to the movement of the spool 200, the combination of connected ports switches as follows.

In the first switching position shown in the left diagram of FIG. 3, the discharge port of the transmission oil pump 112 on the opposite side of the SEC pulley oil chamber 42c is connected to the PRI pulley oil chamber 41c, and the oil passages 123, 124 are not connected to any port. When in the shifting mode, oil is moved between the PRI pulley oil chamber 41c and the SEC pulley oil chamber 42c by driving the transmission oil pump 112 in the state of the first switching position. FIG. 3 shows a case in which oil is made to flow from the SEC pulley oil chamber 42c to the PRI pulley oil chamber 41c, but there are cases in which the oil is made to flow in the opposite direction.

In the second switching position shown in the right diagram of FIG. 3, the discharge port of the transmission oil pump 112 on the opposite side of the SEC pulley oil chamber 42c is connected to the oil passage 123 from the strainer 111, and the PRI pulley oil chamber 41c is connected to the oil passage 124 from the forward/reverse switching mechanism solenoid valve 105. When in the idle stop mode, oil is suctioned from the oil reservoir 127 via the strainer 111 by driving the transmission oil pump 112 in the state of the second switching position. The suctioned oil passes through the idle stop switching valve 114 and a part thereof is supplied to the SEC pulley oil chamber 42c through the transmission oil passage 106. The other part of the suctioned oil passes through an oil passage that branches from the transmission oil passage 106 and reaches the forward/reverse switching mechanism SOL 105, and is supplied to the PRI pulley oil chamber 41c via the oil passage 124 and the idle stop switching valve 114. The oil is also supplied to the lubrication system, the cooling system, and the like, which are not shown in FIG. 3, via an oil passage that branches from the transmission oil passage 106.

As shown in the center diagram of FIG. 3, when switching between the first switching position and the second switching position, there is a state in which the land 201c blocks the port to which the discharge port of the transmission oil pump 112 on the opposite side of the SEC pulley oil chamber 42c is connected. If the leak oil passage 125 and the orifice 122 are not provided, the oil discharged from the transmission oil pump 112 has no place to go, so that the electric motor 113 that drives the transmission oil pump 112 locks up. Such a lockup of the electric motor 113 causes a reduction in the durability of the transmission oil pump 112. In contrast thereto, in the present embodiment, since the oil is discharged via the leak oil passage 125 and the orifice 122, it is possible to prevent the electric motor 113 from locking up.

As described above, the leak oil passage 125 and the orifice 122 of the present embodiment also function to prevent a lockup of the electric motor 113, in addition to making the amount of oil to be compensated by the transmission oil pump 112 greater than or equal to the lower limit flow rate of the transmission oil pump 112.

Figure 4:
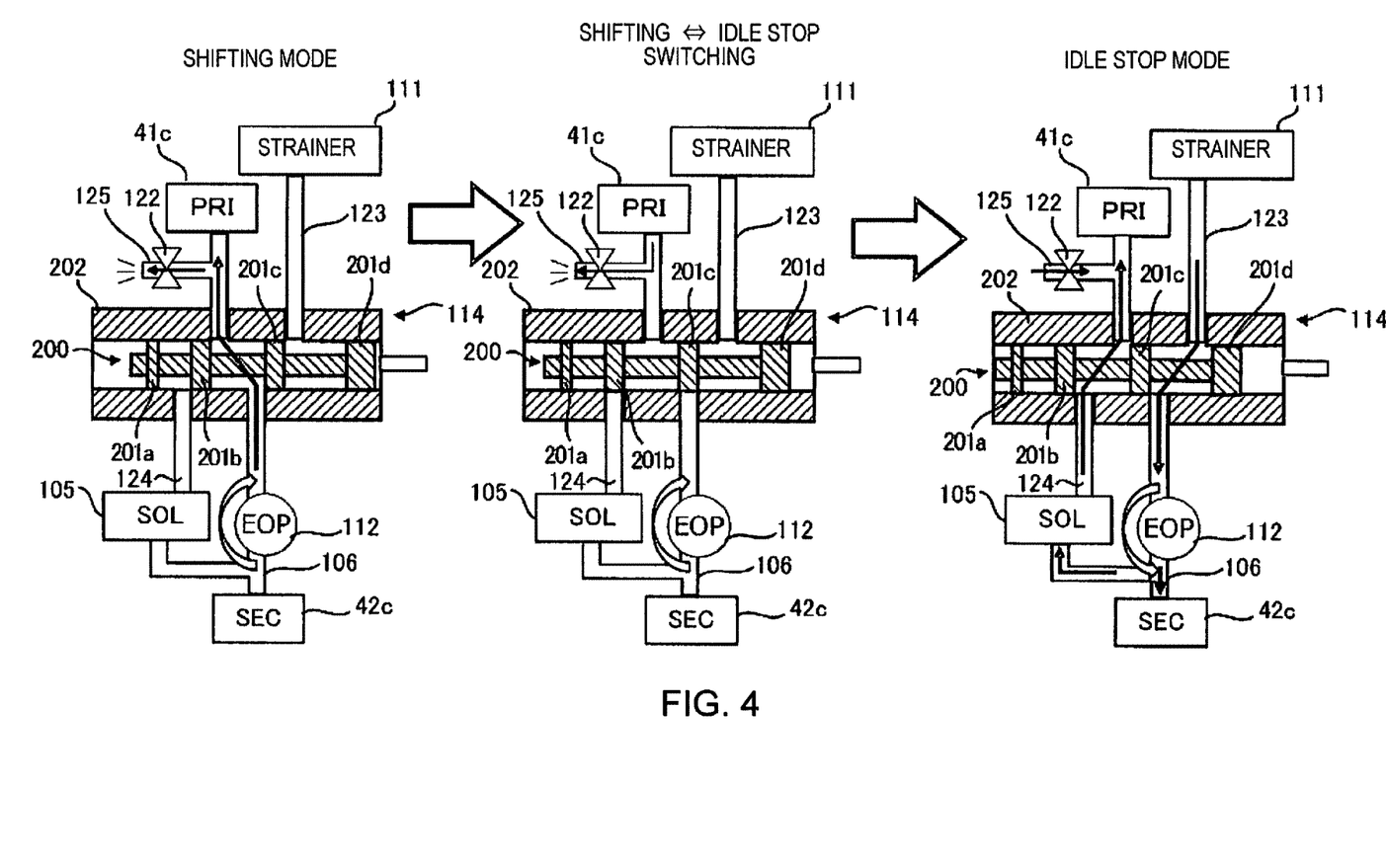
FIG. 4 is a diagram showing a flow of oil and operation of an idle stop switching valve according to a comparative example.

When focusing on the action of making the amount of oil to be compensated by the transmission oil pump 112 greater than or equal to the lower limit flow rate of the transmission oil pump 112, the leak oil passage 125 and the orifice 122 can be disposed as shown in FIG. 4. FIG. 4 is a diagram showing the configuration of a comparative example for explaining the effect of the present embodiment, and is the same as FIG. 3 other than the arrangement of the leak oil passage 125 and the orifice 122. In FIG. 4, the leak oil passage 125 and the orifice 122 are between the PRI pulley oil chamber 41c and the idle stop switching valve 114. The configuration of FIG. 4 exhibits the same action and effects as the present embodiment when in the shifting mode and the idle stop mode (left diagram and right diagram of FIG. 4). However, when switching between the shifting mode and the idle stop mode (center diagram of FIG. 4), the oil discharged from the transmission oil pump 112 has no place to go, so that it is not possible to prevent the lockup of the electric motor 113 described above. In addition, even though the oil of the PRI pulley oil chamber 41c is discharged from the leak oil passage 125, the PRI pulley oil chamber 41c is not connected to either the transmission oil pump 112 or the oil passage 124, so that the hydraulic pressure of the PRI pulley oil chamber 41c decreases. As a result, there is the risk that unintended shifting or belt slippage may occur.

In contrast, by means of the configuration of the present embodiment shown in FIG. 3, the hydraulic pressure of the PRI pulley oil chamber 41c does not decrease when switching between the shifting mode and the idle stop mode (center diagram of FIG. 3).

As described above, the continuously variable transmission of the present embodiment comprises a transmission oil pump (electric oil pump) 112 that is disposed in the transmission oil passage 106 between the PRI pulley oil chamber 41c and the SEC pulley oil chamber 42c, and the controller 10 that drives the transmission oil pump 112. One discharge port of the transmission oil pump 112 is connected to the SEC pulley oil chamber 42c, and the other discharge port is connected to the PRI pulley oil chamber 41c via the idle stop switching valve (oil passage switching valve) 114. The idle stop switching valve 114 is configured to switch between the first switching position in which the PRI pulley oil chamber 41c and the other discharge port are connected, and the second switching position in which the connection between the PRI pulley oil chamber 41c and the other discharge port is cut off and the other discharge port and an oil passage connecting the oil reservoir 127 and the idle stop switching valve 114 are connected. In addition, the continuously variable transmission includes the leak oil passage 125 and the orifice 122, in the transmission oil passage 106 between the transmission oil pump 112 and the idle stop switching valve 114, as a discharge mechanism for discharging the oil discharged from the other discharge port out of the transmission oil passage 106.

As a result, since it is possible to prevent the lockup of the electric motor 113 when switching the idle stop switching valve 114, the reliability of the transmission oil pump 112 is improved. In addition, since it is possible to suppress a decrease in the PRI hydraulic pressure at the time of switching, occurrence of unintended shifting or belt slippage can be prevented at the time of switching.

Second Embodiment

Figure 5:
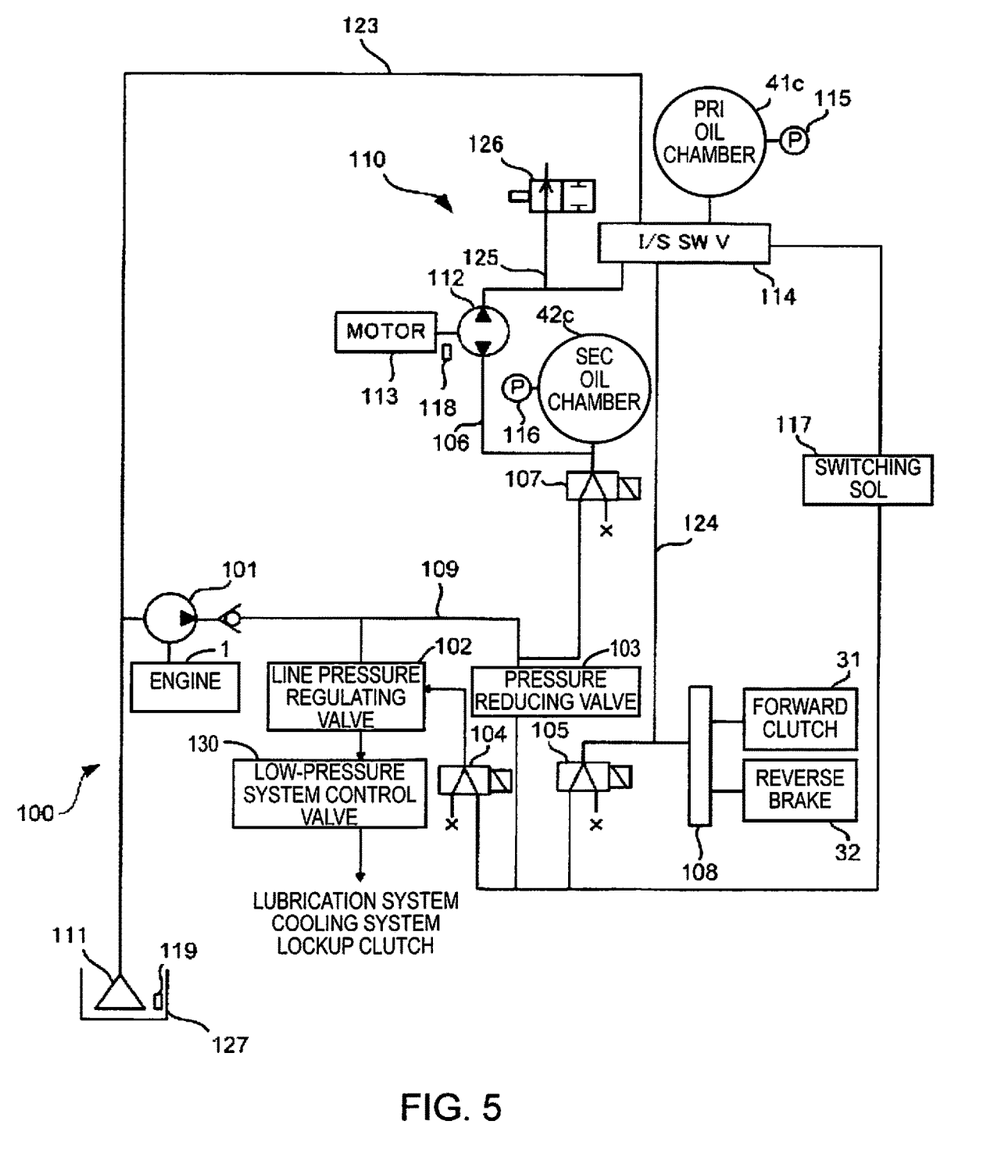
FIG. 5 is a schematic overview diagram of a hydraulic circuit according to a second embodiment.

FIG. 5 is a schematic overview diagram of the hydraulic circuit 100 according to a second embodiment. The difference from FIG. 2 is that an openable and closable leak valve 126 is provided in the leak oil passage 125 instead of the orifice 122 of FIG. 2.

In the configuration of the first embodiment, oil leaks continuously from the oil passage 125. Therefore, for example, when the amount of the leak in the PRI pulley oil chamber 41c in the shifting mode is greater than the lower limit flow rate described above, oil leaks from the orifice 122 even when it is not necessary to allow leakage from the orifice 122. The transmission oil pump 112 would also compensate the leak from the orifice 122. That is, the transmission oil pump 112 would consume unnecessary energy.

In contrast thereto, in a configuration that uses the leak valve 126 as in the present embodiment, the leak valve 126 is closed when it is not necessary to allow leakage, so that it is possible to suppress the unnecessary energy consumption of the transmission oil pump 112. Then, the leak valve 126 opens when between the shifting mode and the idle stop mode, that is, when switching between the first switching position and the second switching position, so that it is possible to prevent the lockup of the electric motor 113 described above.

Here, a specific example of the open/close control of the leak valve 126 will be described.

Figure 6:
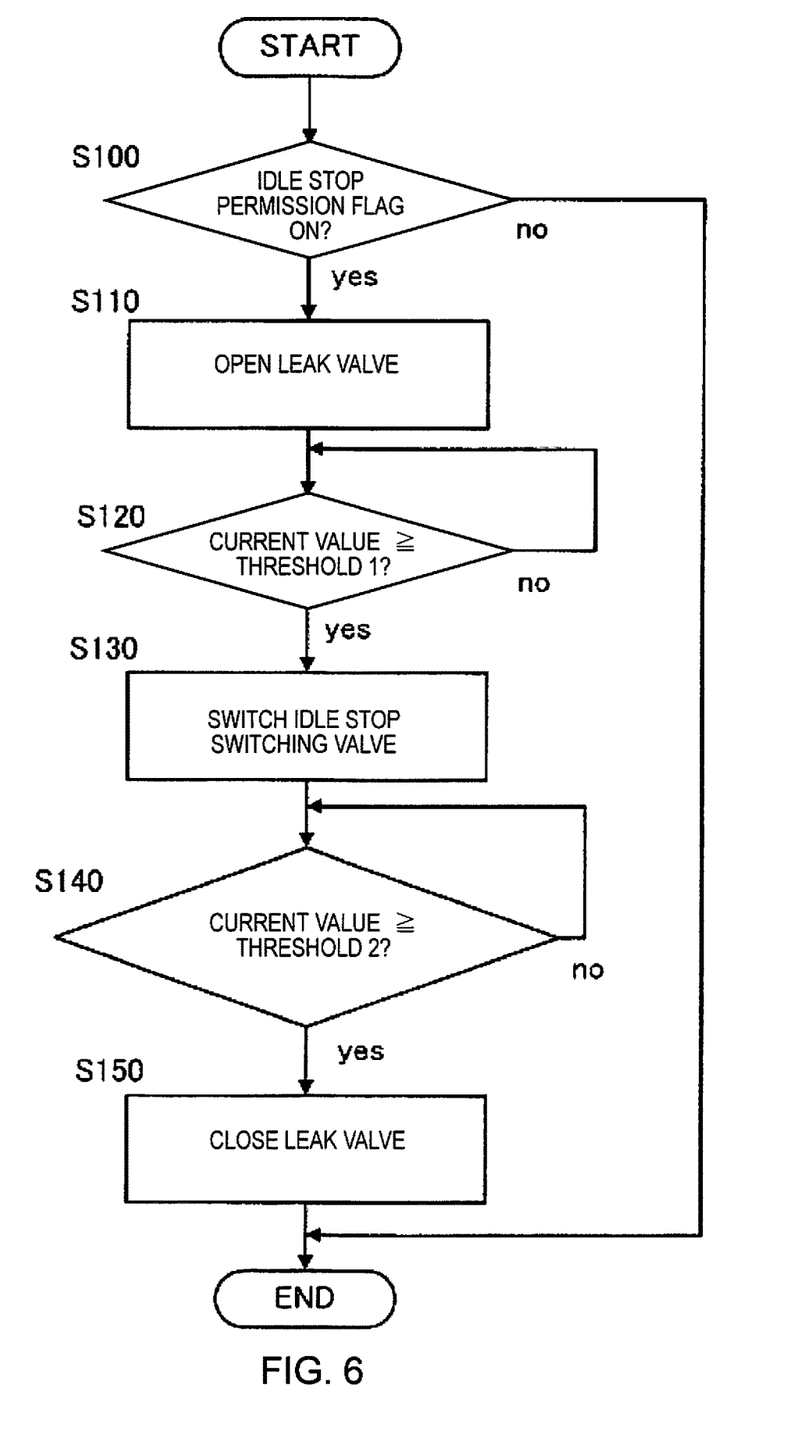
FIG. 6 is a flowchart showing one example of a leak valve control routine.

FIG. 6 is a flowchart showing a control routine of the leak valve 126 programmed in the controller 10. The present routine is executed when switching from the shifting mode (first switching position) to the idle stop mode (second switching position).

In Step S100, the controller 10 determines whether an idle stop permission flag is ON, executes the process of Step S110 if ON, and ends the present routine if OFF. The idle stop permission flag turns ON when a prescribed idle stop permission condition is satisfied. The idle stop permission condition is the same as a known idle stop control, such as a state in which the vehicle is stopped, and the brake pedal is depressed.

In the case of a vehicle in which coast stop is executed instead of idle stop, the determination in Step S100 is carried out based on a coast stop permission flag. The coast stop permission flag turns ON when a prescribed coast stop permission condition is satisfied. Similar to a known coast stop control, the coast stop permission condition is satisfied when, for example, the vehicle speed is less than or equal to a prescribed vehicle speed and the brake pedal is being depressed.

In Step S110, the controller 10 opens the leak valve 126.

In Step S120, the controller 10 determines whether the leak valve 126 is in a completely open state based on the current value that flows through the leak valve 126, executes the process of Step S130 in the case of a completely open state, and repeats the determination of Step S120 if not in a completely open state. Specifically, the current value when the leak valve is in a completely open state is set in advance as threshold 1, and the current value and the threshold 1 are compared. It is determined to be a completely open state if the current value is greater than or equal to the threshold 1, and it is determined not to be a completely open state if the current value is smaller than the threshold 1.

In Step S130, the controller 10 starts the switching of the idle stop switching valve 114.

In Step S140, the controller 10 determines whether switching from the first switching position to the second switching position has been completed based on the current value that flows in the switching SOL 117, which drives the idle stop switching valve 114. For example, in the case of a configuration in which the switching SOL 117 switches from the first switching position to the second switching position by increasing the current value, the current value at the time of the second switching position is set as threshold 2, and the switching is determined to have been completed if the current value is greater than or equal to the threshold 2.

If it is determined that switching has been completed, the controller 10 closes the leak valve 126 and ends the present routine in Step S150, and if it is determined that switching has not been completed, the determination of Step S140 is repeated.

Figure 7:
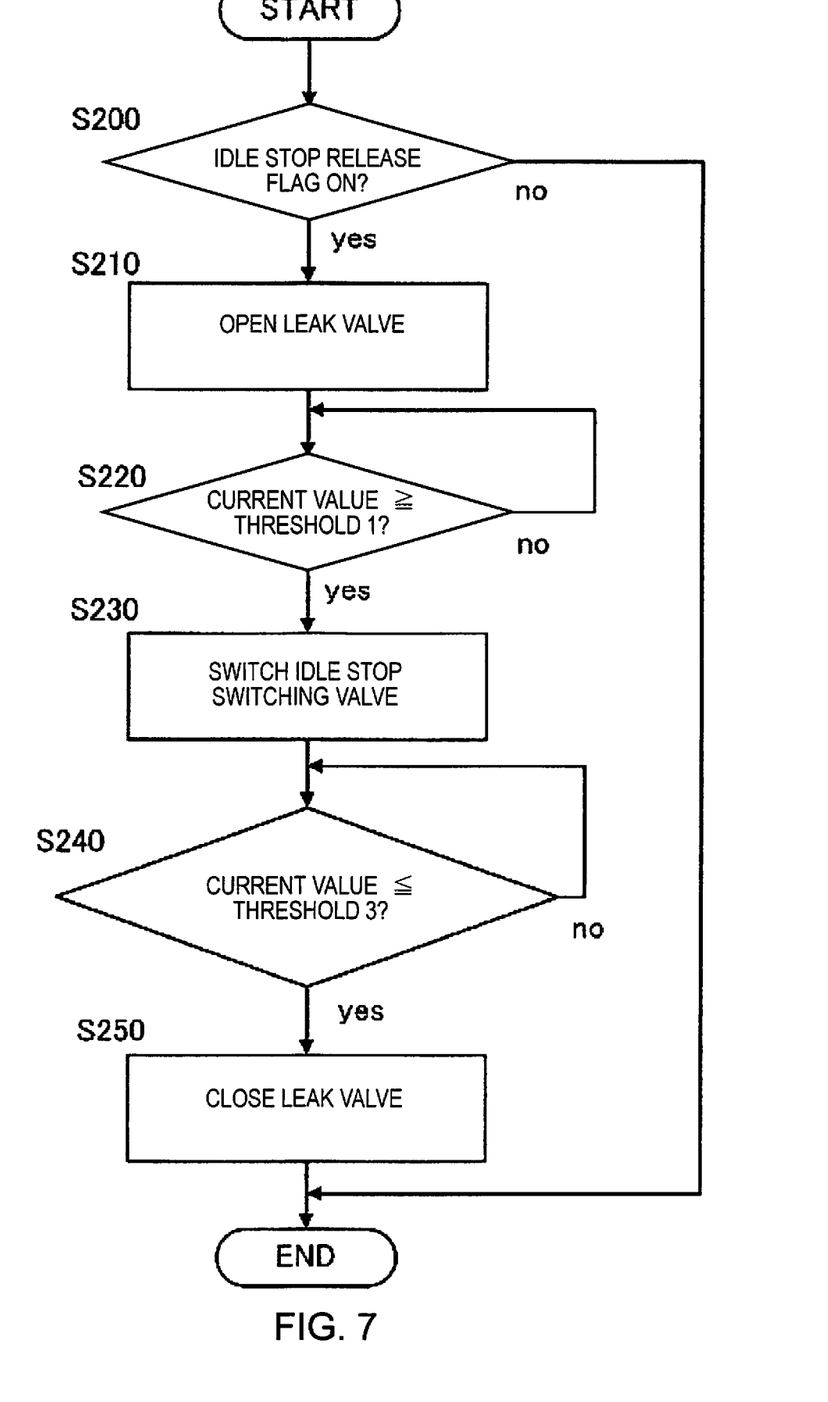
FIG. 7 is a flowchart showing another example of the leak valve control routine.

FIG. 7 is a flowchart showing a control routine of the leak valve 126 programmed in the controller 10. The present routine is executed when switching from the idle stop mode (second switching position) to the shifting mode (first switching position). The difference from FIG. 6 is Step S200 and Step S240. Steps S210 to S230, and Step S250 are the same as Step S110 to S130 and S150 of FIG. 6, so that descriptions thereof are omitted.

In Step S200, the controller 10 determines whether an idle stop release flag is ON. The idle stop release flag turns ON when a prescribed idle stop release condition is satisfied during idle stop. The idle stop release condition is the same as a known idle stop control, and is satisfied when the depression amount of the brake pedal decreases during idle stop, for example. The controller 10 executes the process of Step S210 if the idle stop release flag is ON, and ends the present routine if OFF.

In Step S240, the controller 10 determines whether switching from the second switching position to the first switching position has been completed based on the current value that flows in the switching SOL 117, which drives the idle stop switching valve 114. For example, in the case of a configuration in which the switching SOL 117 switches from the second switching position to the first switching position by decreasing the current value, the current value at the time of the first switching position is set as threshold 3, and the switching is determined to have been completed if the current value is less than or equal to the threshold 3.

If it is determined that switching has been completed, the controller 10 closes the leak valve 126 and ends the present routine in Step S250, and if it is determined that the switching has not been completed, the determination of Step S240 is repeated.

As described above, in the present embodiment, the leak oil passage 125 is provided with the openable and closable leak valve 126. As a result, it is possible to suppress unnecessary energy consumption by the electric motor 113 by closing the leak valve 126 when it is not necessary to allow leakage.

In the present embodiment, the leak valve 126 is opened when switching between the first switching position and the second switching position of the idle stop switching valve 114. There is a period during which the port that connects to the transmission oil pump 112 of the idle stop switching valve 114 is closed when switching between the first switching position and the second switching position, however, by means of the present embodiment the oil leaks from the leak oil passage 125; therefore, it is possible to prevent lockup of the electric motor 113.

In the present embodiment, the leak valve 126 is opened at a timing earlier than the start of the switching operation of the idle stop switching valve 114. More specifically, the leak valve 126 is opened when the idle stop condition (engine stop condition) is satisfied during operation of the vehicle, and the idle stop switching valve 114 switches from the first switching position to the second switching position when the leak valve 126 is opened. In addition, the leak valve 126 is opened when the idle stop release condition (engine restart condition) is satisfied during idle stop, and the idle stop switching valve 114 switches from the second switching position to the first switching position when the leak valve 126 is opened. After the switching of the idle stop switching valve 114 is completed the leak valve 126 closes. Thus, it is possible to more reliably prevent the lockup of the electric motor 113.

Third Embodiment

Figure 8:
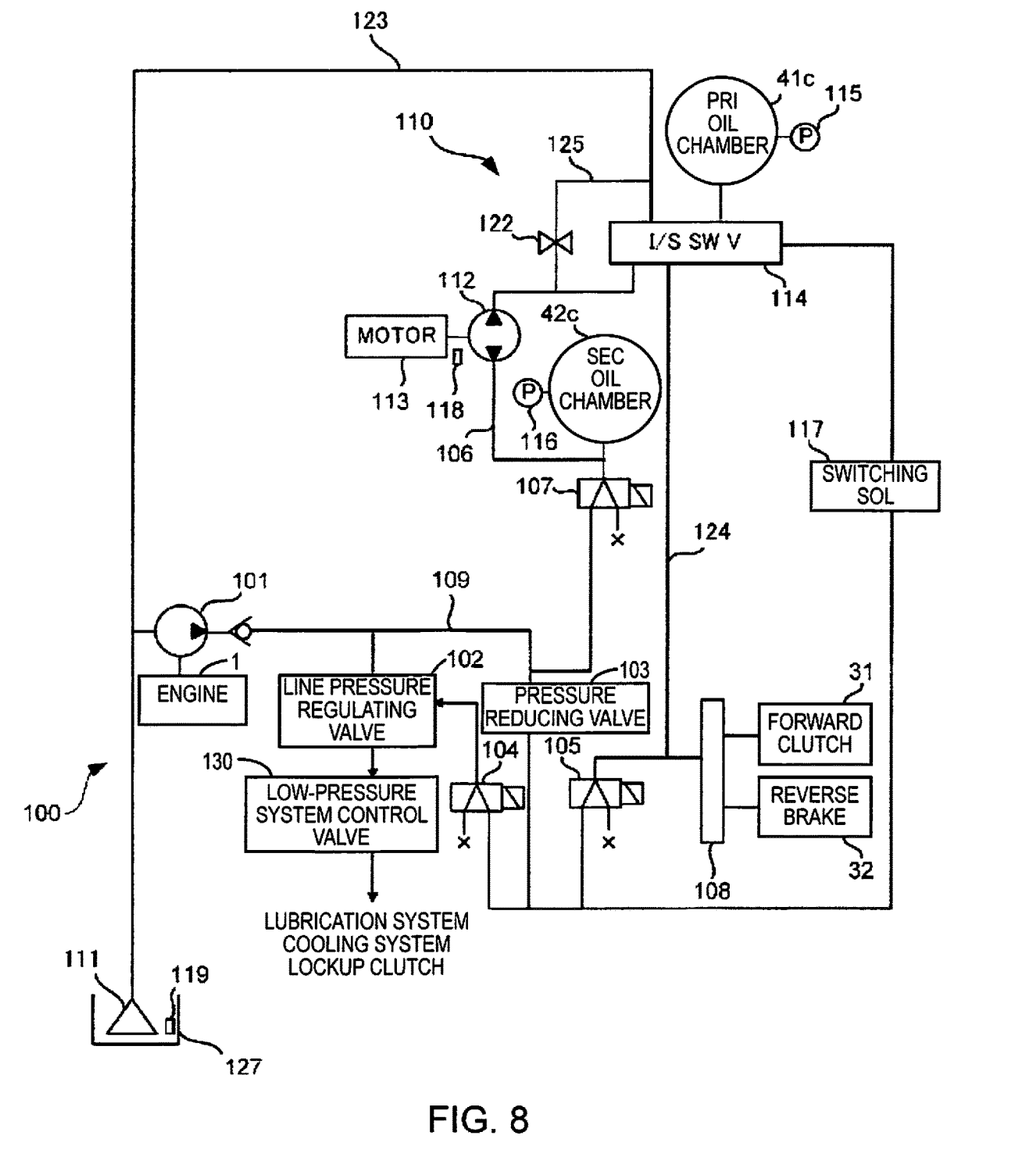
FIG. 8 is a schematic overview diagram of a hydraulic circuit according to a third embodiment.

FIG. 8 is a schematic overview diagram of the hydraulic circuit 100 according to a third embodiment. In the hydraulic circuit 100 of the present embodiment, the end (hereinafter also referred to as "one end") of the leak oil passage 125 on the opposite side of the transmission oil pump 112, with the orifice 122 therebetween, is connected to the oil passage 123 between the strainer 111 and the idle stop switching valve 114.

The action and effects of the configuration described above will be described by comparison with the configuration of the first embodiment shown in FIG. 3, that is, the configuration in which one end of the leak oil passage 125 is an open end.

Figure 9:
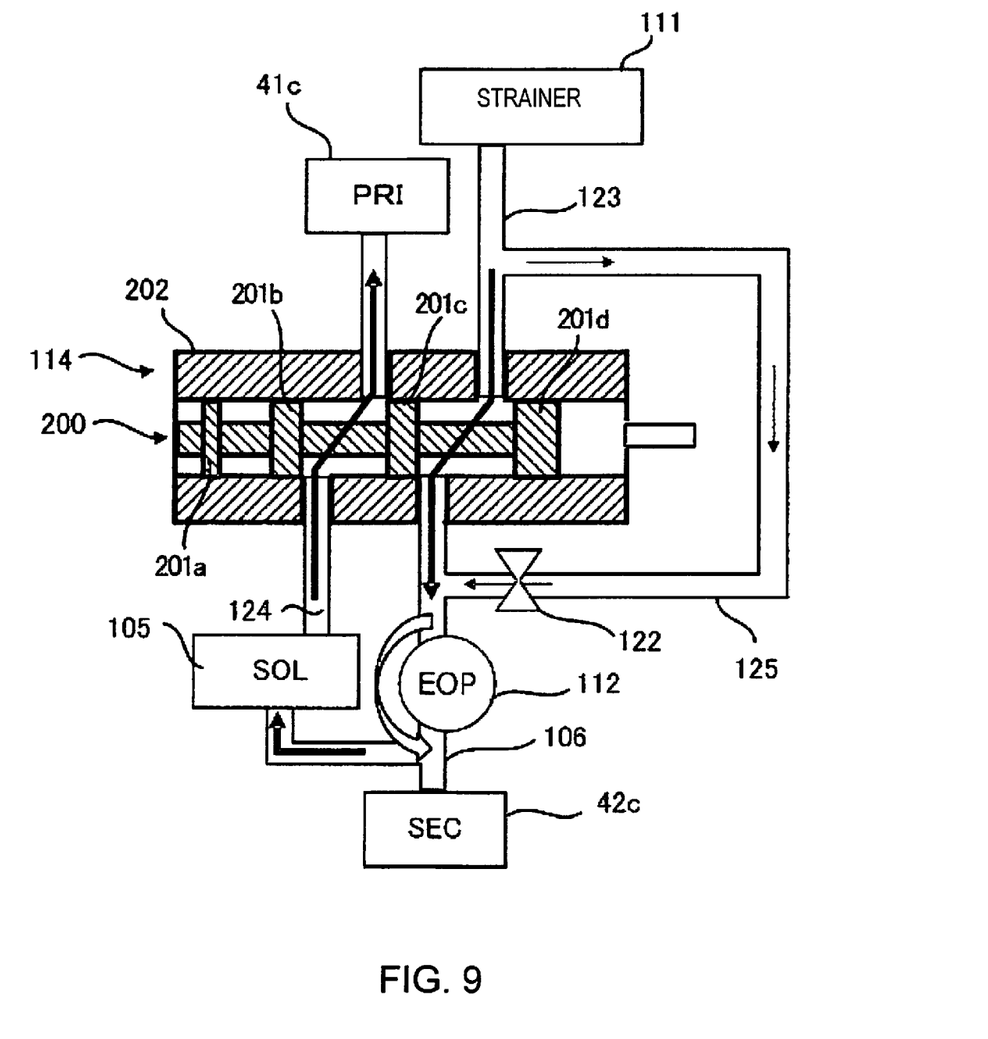
FIG. 9 is a diagram showing a flow of oil in an idle stop mode of a hydraulic circuit according to a third embodiment.

FIG. 9 is a diagram showing a flow of oil in the idle stop mode of the configuration according to the present embodiment. The black arrows in the drawing indicate the flow of the oil.

In the idle stop mode, oil that passes through the strainer 111 passes through the oil passage 123 and the idle stop switching valve 114 and is suctioned into the transmission oil pump 112, and is supplied therefrom to the SEC pulley oil chamber 42c, the PRI pulley oil chamber 41c, and the like.

If one end of the leak oil passage 125 is an open end, oil is also suctioned from the leak oil passage 125, as shown in the right diagram of FIG. 3. That is, oil that has not passed through the strainer 111 flows into the hydraulic circuit 100. As a result, there is a risk that contaminants may mix into the hydraulic circuit 100 via the leak oil passage 125.

In contrast thereto, as shown in FIG. 9, in the configuration of the present embodiment the oil passing through the orifice 122 and suction in from the leak oil passage 125 is oil that has passed through the strainer 111, so the immixing of contaminants can be suppressed.

In the shifting mode, if one end of the leak oil passage 125 is an open end, the leaked oil is discharged out of the hydraulic circuit 100 as shown in the left diagram of FIG. 3, but in the configuration of the present embodiment, the leaked oil flows into the oil passage 123.

In addition, in FIGS. 8 and 9, although one end of the leak oil passage 125 is connected to the oil passage 123, the invention is not limited thereto. It is sufficient if one end of the leak oil passage 125 joins the oil passage connected to the strainer 111, from among the oil passages connected to the discharge port of the transmission oil pump 112 on the opposite side of the discharge port connected to the SEC pulley oil chamber 42c via the idle stop switching valve 114. For example, if there is an oil passage that connects the strainer 111 and the idle stop switching valve 114 other than the oil passage 123, the leak oil passage 125 can be connected to that oil passage.

As described above, in the present embodiment, the leak oil passage 125 branches from the transmission oil passage 106 between the transmission oil pump 112 and the idle stop switching valve 114, and joins the oil passage 123 that connects to the strainer 111, from among the oil passages that connect to the discharge port of the transmission oil pump 112 via the idle stop switching valve 114. Thus, it is possible to prevent contaminants from entering the hydraulic circuit 100 when in the idle stop mode.

In addition, since it is possible to prevent contamination when in the idle stop mode by using the strainer 111 provided in an ordinary vehicle, it is not necessary to provide a separate strainer for preventing contamination when in the idle stop mode. Therefore, it is possible to reduce the size and weight of the system, as well as the cost.

Although embodiments of the present invention have been described above, these embodiments merely illustrate some application examples of the present invention, and are not intended to limit the technical scope of the present invention to the specific configurations of the above-described embodiments.

The invention claimed is:

1. A continuously variable transmission comprising:
   an electric oil pump disposed in an oil passage between a primary pulley oil chamber and a secondary pulley oil chamber and controlling flow of oil into and out of the primary pulley oil chamber,
   the electric oil pump having a first discharge port connected to the secondary pulley oil chamber, and a second discharge port connected to the primary pulley oil chamber via an oil passage switching valve,
   the oil passage switching valve being configured to switch between a first switching position in which the primary pulley oil chamber and the second discharge port are connected, and a second switching position in which the primary pulley oil chamber and the second discharge port are disconnected and in which the second discharge port and an oil passage connecting an oil reservoir and the oil passage switching valve are connected,
   the continuously variable transmission including a discharge mechanism in an oil passage between the electric oil pump and the oil passage switching valve for discharging from the oil passage the oil that is discharged from the second discharge port, and
   the discharge mechanism including a leak valve that is opened when switching the oil passage switching valve between the first switching position and the second switching position.

2. The continuously variable transmission according to claim 1, wherein
   the leak valve is opened at a timing earlier than a start of a switching operation of the oil passage switching valve.

3. The continuously variable transmission according to claim 2, wherein
   the leak valve is opened when an engine stop condition is satisfied during operation of a vehicle, and
   the oil passage switching valve is switched from the first switching position to the second switching position after the leak valve is opened.

4. The continuously variable transmission according to claim 3, wherein
   the leak valve is opened when an engine restart condition is satisfied during the operation of the vehicle and the engine is stopped, and
   the oil passage switching valve is switched from the second switching position to the first switching position after the leak valve is opened.

5. The continuously variable transmission according to claim 1, wherein
   the leak valve is opened after switching of the oil passage switching valve is completed.

6. The continuously variable transmission according to claim 1, wherein
   the discharge mechanism includes an oil passage that branches from the oil passage between the electric oil pump and the oil passage switching valve and that joins an oil passage that connects to a strainer and to the second discharge port via the oil passage switching valve.

7. A method for controlling a continuously variable transmission that controls flow of oil into and out of a primary pulley oil chamber by use of an electric oil pump disposed in an oil passage between the primary pulley oil chamber and a secondary pulley oil chamber such that the electric oil pump has a first discharge port connected to the secondary pulley oil chamber, and a second discharge port connected to the primary pulley oil chamber via an oil passage switching valve, the method comprising:
   switching the oil passage switching valve in accordance with a vehicle driving state between a first switching position in which the primary pulley oil chamber and the second discharge port are connected, and a second switching position in which the primary pulley oil chamber and the second discharge port are disconnected and in which the second discharge port and an oil passage connecting an oil reservoir and the oil passage switching valve are connected; and
   opening an openable and closable leak valve provided in an oil passage between the electric oil pump and the oil passage switching valve and discharging a part of the oil that is discharged from the electric oil pump from the oil passage between the electric oil pump and the oil passage switching valve when switching between the first switching position and the second switching position.

* * * * *